United States Patent

Fukushima et al.

[11] Patent Number: 6,052,506
[45] Date of Patent: Apr. 18, 2000

[54] CONTROL SYSTEM FOR COMBINED DIGITAL VIDEO SIGNAL RECEIVER AND RECORDING/REPRODUCING APPARATUS

[75] Inventors: Shinichi Fukushima; Koichi Goto, both of Kanagawa; Junichi Tsukamoto, Tokyo, all of Japan

[73] Assignee: Sony Corporation, Tokyo, Japan

[21] Appl. No.: 08/944,115

[22] Filed: Oct. 6, 1997

Related U.S. Application Data

[63] Continuation of application No. 08/505,953, Jul. 24, 1995, abandoned.

[30] Foreign Application Priority Data

Jul. 29, 1994 [JP] Japan .................................. 6-197297

[51] Int. Cl.[7] .................................................. H04N 5/775
[52] U.S. Cl. ........................................... 386/46; 348/734
[58] Field of Search .................................. 348/6, 731–734; 386/1, 46, 124; 341/176; 359/142, 146; H04N 5/44, 5/775

[56] References Cited

U.S. PATENT DOCUMENTS

| | | | |
|---|---|---|---|
| 4,334,242 | 6/1982 | Mangold | 348/46 |
| 4,748,501 | 5/1988 | Long | 348/734 |
| 4,989,081 | 1/1991 | Miyagawa et al. | 348/734 |
| 5,081,534 | 1/1992 | Geiger et al. | 348/734 |
| 5,291,343 | 3/1994 | Goto | 348/734 |
| 5,335,116 | 8/1994 | Onishi et al. | 386/124 |
| 5,341,166 | 8/1994 | Garr et al. | 348/734 |
| 5,367,316 | 11/1994 | Ikezaki | 348/734 |
| 5,488,357 | 1/1996 | Sato et al. | 348/734 |
| 5,532,732 | 7/1996 | Yuen et al. | 386/83 |
| 5,736,931 | 4/1998 | Sato et al. | 348/734 |

*Primary Examiner*—Thai Tran
*Attorney, Agent, or Firm*—Frommer Lawrence & Haug, LLP.; William S. Frommer; Dennis M. Smid

[57] ABSTRACT

A stand-alone video receiver, having a simplified user interface and control system, is connected to a video recording and reproducing apparatus (recorder), having a more complex user interface and control system, and both the receiver and the recorder are controlled through the complex user interface and control system of the recorder while the user interface and control system of the receiver are disabled.

5 Claims, 5 Drawing Sheets

CONTROL SYSTEM FOR COMBINED DIGITAL VIDEO SIGNAL RECEIVER AND RECORDING/REPRODUCING APPARATUS

This application is a continuation of application Ser. No. 08/505,953, filed Jul. 24, 1995, now abandoned.

BACKGROUND OF THE INVENTION

This invention relates to a system for controlling a digital signal receiver and a digital recording/reproducing apparatus through the user interface of the recording/reproducing apparatus.

Digital broadcast signal receiving systems are used by video program consumers to receive, record, and/or display digital video programming distributed through cable networks or other distribution systems such as direct satellite broadcast systems. Such receiving systems are typically comprised of a digital video signal receiving apparatus and a display apparatus and may additionally include a digital video signal recording/reproducing apparatus. Each apparatus typically includes a separate and independent user interface and control device for controlling the particular apparatus. Also, such receiving systems usually include one or more remote control devices for separately controlling each apparatus.

In a cable network or direct satellite broadcast system, each subscriber needs at least a signal receiving apparatus and a display apparatus in order to receive and display video programming transmitted through the network. While some subscribers may be satisfied with simply displaying video programming concurrent with its reception, others may further desire to record and later reproduce the transmitted video programming. To accommodate these different levels of signal processing, modular digital broadcast signal receiving systems, including a signal receiving apparatus and an optionally-attached recording/reproducing apparatus, have been developed. Such a system has the advantage of being flexible; signal reception and/or signal recording/reproducing functions can be offered to cable network subscribers simply by adding or removing modules.

Where each of the signal receiving, display, and recording/reproducing apparatuses in a modular receiving system is independently controlled by the user, the task of configuring each apparatus is often a complex endeavor. Typically, a user requires operational information about all three apparatuses in order to properly configure and coordinate the operation of each with that of the others. Through a cumbersome process of juggling remote controllers, or switching among the control modes of a single remote controller, the user supplies control commands to each apparatus, individually, through its own separate user interface. To further complicate matters, each user interface may utilize different or even inconsistent input commands to effect otherwise identical functions.

In a related development, a modular receiving system has been proposed in which the control device of the video signal receiver functions to control both the receiver and an associated video recording/reproducing apparatus. Advantageously, the control device is operated by a user through a single user interface. Such a system, although providing a simplified mechanism for controlling the individual apparatuses which together form a receiving system, is not particularly cost-effective. A video signal receiver capable of controlling other apparatuses would necessarily include a more complicated and more expensive user interface device and controller device as compared to a video signal receiver that is limited to controlling its own internal functions.

This additional complexity and expense of such a device is a significant concern since a potentially prevalent implementation of the modular receiving system includes only the video signal receiver. Such an implementation would likely be used by consumers desirous of only receiving and simultaneously displaying broadcast video programming. It is expected that such consumers would be reluctant to bear the additional expense of a video receiver capable of controlling other apparatuses when the additional functionality will remain unutilized.

Hence, an economical and flexible receiving system having only one user interface and one control device operating to control the entire receiving system is still needed.

OBJECTS AND SUMMARY OF THE INVENTION

An object of the present invention is to provide a simplified control system for controlling multiple apparatuses in a video receiving system.

More specifically, it is an object of the present invention to provide a simplified control system for controlling a digital video signal receiver and a digital video signal recording/reproducing apparatus.

Another object of the present invention is to provide a modular video receiving system which is controlled by a user through a single user interface regardless of the combination of modules which comprise the receiving system.

A further object of the present invention is to provide a control system for controlling a number of modules in a modular video receiving system which includes a video signal receiver module not capable of controlling a recording/reproducing module.

A still further object of the present invention is to provide a simplified control system for controlling a modular video receiving system in order to reduce the potential for user error in configuring and controlling the modules that comprise the receiving system.

In accordance with the present invention, a video signal receiving system is formed from a video signal receiver and a video signal recording and reproducing apparatus. The video signal receiver has a simple user interface and control system for controlling internal operations; while the video signal recording and reproducing apparatus (for convenience, referred to as a recorder) has a complex user interface and control system for controlling the operations of both the receiver and the recorder. When not connected to the recorder, the receiver is user-controlled through its user interface and control system. However, when connected to the recorder, the user interface and control system of the receiver are disabled and the user controls the operation of both the receiver and the recorder through the user interface and control system of the recorder.

The above, and other objects, features and advantages of the present invention will become apparent from the following detailed description of illustrative embodiments when read in conjunction with the accompanying drawings in which substantially identical components are identified by the same reference numerals.

DETAILED DESCRIPTION OF THE PREFERRED EMBODIMENTS

A control system for a combined digital video signal receiver and digital video signal recording/reproducing apparatus according to the present invention is suitable for use in a digital video programming distribution system to provide a unified and more convenient user interface for a video programming consumer. Such a control system is advantageously incorporated into most, if not all, video distribution systems such as a land-based broadcast system, a satellite broadcast system, a cable television system, a fiber optic network, an interactive video communication system, or the like. Through the various distribution systems, high-speed video transmissions, video on-demand services, interactive shopping and interactive entertainment or the like can be offered to consumers. Implementation of the present invention in such systems simplifies the consumer's access to such programming and services, thereby increasing their overall appeal.

The control system of the present invention enables a user to control both the operation of a video receiver, which receives video programming from a distribution system, and a video recording/reproducing apparatus which records the received video programming or reproduces prerecorded video programming. All of this functionality is achieved through a single user interface incorporated into the video recording/reproducing apparatus.

Figure 1:
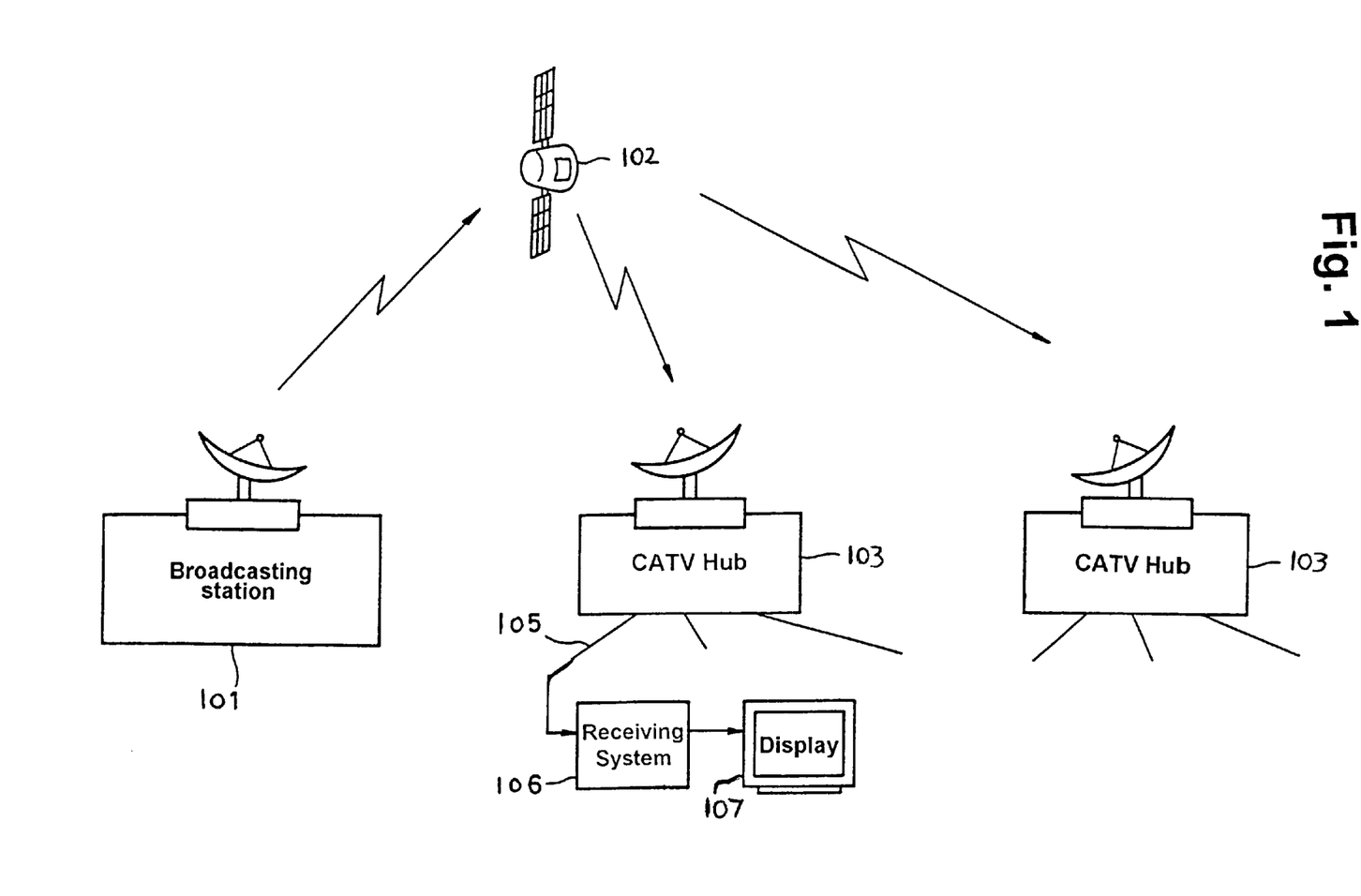
FIG. 1 is a schematic diagram of a satellite broadcast system in which the present invention finds ready application.

An illustrative implementation of the present invention is depicted in FIG. 1. FIG. 1 illustrates a CATV satellite video broadcast system incorporating a video receiving system 106 which includes a control system for a combined digital video signal receiver and video recording/reproducing apparatus according to the present invention. The CATV satellite video broadcast system comprises a broadcasting station 101, a relay satellite 102, a CATV hub 103, a video link 105, the receiving system 106, and a display 107.

Broadcasting station 101 transmits video signals to receiving system 106 via relay satellite 102, CATV hub 103, and video link 105. Relay satellite 102 receives video signals from broadcasting station 101 and supplies the signals to one or more CATV hubs 103. Each CATV hub 103 receives video signals from satellite 102 and processes the signals into a suitable form for transmission on video link 105 which connects CATV hub 103 to receiving system 106. The CATV hub transmits the video signals, through the video link, to receiving system 106.

In accordance with user input, receiving system 106 decodes the video signals (if, as is typical, the video signals received via the video link are encoded) and, if selected by the user, the video signals are recorded (the video signals may be recorded after decoding or, if desired, the video signals may be recorded in their encoded form). Preferably, the video signals are recorded on a conventional recording medium, such as a video tape, a video disc, a semiconductor memory chip, or the like. Decoded video signals are supplied to display 107 to which receiving system 106 is coupled. Display 107 is preferably a conventional device, such as a television display, for displaying video signals to a user. Additionally, a user may control receiving system 106 through the control system of the present invention to reproduce prerecorded video signals for display on display 107.

A variety of video programming and interactive video services may be supplied by broadcasting station 101, through satellite 102, CATV hub 103 and video link 105, to receiving system 106. Such programming and services may include, but are not limited to, commercial video broadcasting, subscription video programming, video-on-demand services, interactive shopping, interactive entertainment, multiple-user interactive entertainment, and the like. If receiving system 106 comprises a video signal receiver but not a video recording/reproducing apparatus, it is contemplated that only a subset of the aforementioned programming and services will be accessible. In contrast, if the receiving system comprises a video signal receiver and a video signal recording/reproducing apparatus, it is expected that most, if not all, of such programming and services will be accessible.

In a typical embodiment, CATV hub 103 includes an antenna for receiving video signals from satellite 102 and an amplifier for amplifying the received signals. The CATV hub may also include a device for mixing additional video signals with the received video signals. Additionally, the CATV hub is provided with a modulating device and a multiplexer for converting the received video signals into a format suitable for transmission on video link 105.

Figure 2:
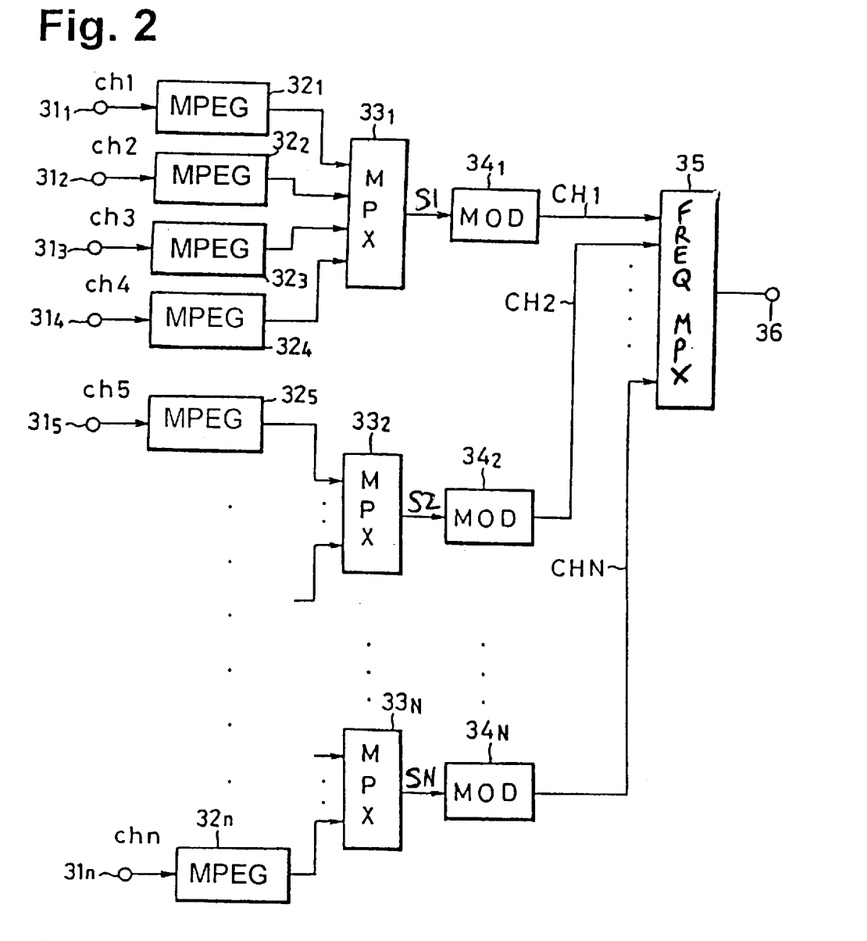
FIG. 2 is a block diagram illustrating in further detail the CATV hub of FIG. 1.

One embodiment of CATV hub 103 is illustrated in FIG. 2 and comprises MPEG video signal encoders $32_1$–$32_n$, video signal multiplexers $33_1$–$33_N$, video signal modulators $34_1$–$34_N$, and a frequency multiplexer 35. The quantity "n" is an integer value representing the aggregate number of video programs supplied by broadcaster 101 and other video signal sources. The quantity "N" is an integer value representing the number of video signal channels (CH1–CHN) that are to be transmitted through video link 105.

Each of the digital video signal sources, including satellite 102, are coupled to one or more input terminals $31_1$–$31_n$ of the CATV hub, which, in turn, are coupled, respectively, to MPEG encoders $32_1$–$32_n$. Each video source supplies a channel of video programming (ch1–chn) to an encoder through the corresponding input terminal and each encoder $32_1$–$32_n$ encodes the channel of video programming supplied thereto to facilitate its transmission through video link 105.

Preferably, each of encoders $32_1$–$32_n$ compresses the channel of video programming to reduce the amount of digital data required to transmit the video signals through the video link. Specifically, it is contemplated that encoders $32_1$–$32_n$ compress digital video data according to the Moving Pictures Experts Group (MPEG) standard or some other similar encoding standard. Alternatively, encoders $32_1$–$32_n$ may additionally scramble or encrypt the video signals to protect against unauthorized reception and viewing of the video programming. Preferably, encryption of the video programming occurs according to a particular encryption key and the corresponding decryption key is transmitted along with the channel of encrypted video signals to the receiving system 106 or, as an alternative, the decryption key may be stored at the receiving system.

Each of encoders $32_1-32_n$ supplies an encoded channel of video signals to at least one of multiplexers $33_1-33_N$. As illustrated in FIG. 2, encoders $32_1$, $32_2$, $32_3$, and $32_4$ are coupled to multiplexer 331 Each of multiplexers $33_1-33_N$ time-division multiplexes the encoded channels of video signals it receives to produce a time-division multiplexed signal S1, S2, . . . SN, respectively. An example of the time-division multiplexed signal S1 produced by multiplexer $33_1$ is illustrated in FIG. 3.

Figure 3:
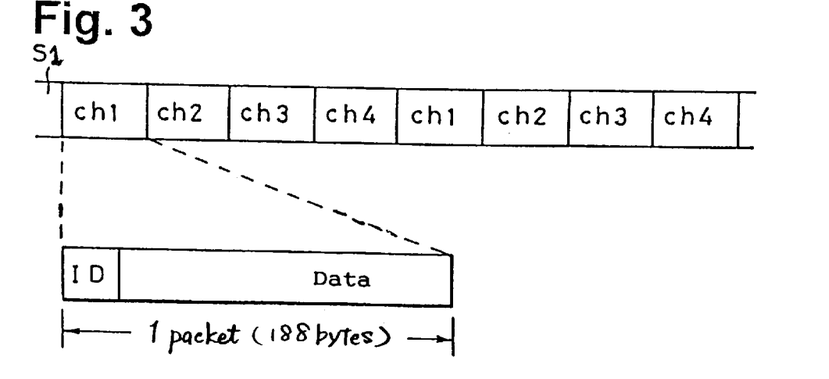
FIG. 3 is a timing diagram to which reference will be made in explaining the operation of the time division multiplexer $33_1$ of FIG. 2.

In FIG. 3, each channel of encoded video signals (ch1–ch4) is divided into packets of data of a certain length. It is preferred that each packet has a fixed length of 188 bytes, although packets of other lengths and variable length packets are contemplated. Additionally, it is preferred that the packet is comprised of four bytes of identification (ID) codes and the remaining 172 bytes are allocated for video data. Multiplexer $33_1$ arranges the packets of data in a periodic pattern to produce the time-division multiplexed signal S1 as illustrated. Alternatively, it is contemplated that multiplexers $33_1-33_N$ arrange the packets of data in other conventional manners.

Returning to the diagram of FIG. 2, multiplexers $33_1-33_N$ supply signals S1–SN to modulators $34_1-34_N$, respectively. Each of the multiplexed signals S1, S2, . . . SN is utilized by a respective modulator $34_1$, $34_2$, . . . $34_N$ to modulate the carrier frequency of a corresponding channel (CH1, CH2, . . . CHN) of video link 105. Preferably, modulators $34_1-34_N$ digitally modulate the signals by a method such as FSK or the like. Each of modulators $34_1-34_N$ supplies to frequency multiplexer 35 a respective channel CH1, CH2, . . . CHN which contains the corresponding multiplexed signal. Frequency multiplexer 35 frequency multiplexes the channels CH1–CHN to produce a composite video signal which is output through an output terminal 36.

Figure 4:
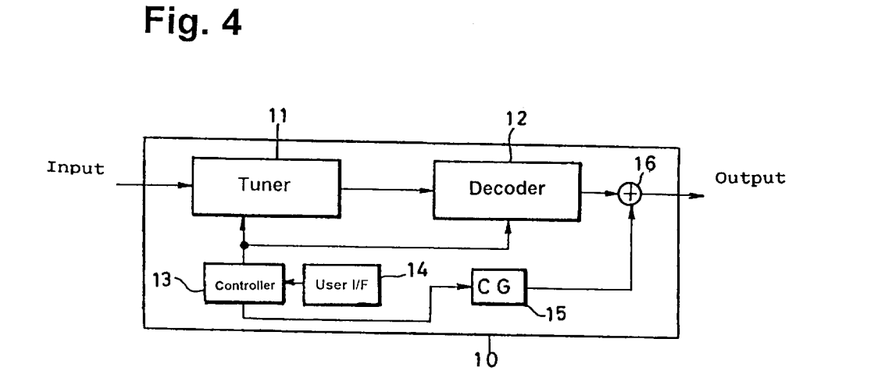
FIG. 4 is a block diagram of a video signal receiver according to an embodiment of the present invention.

FIG. 4 illustrates one embodiment of a video signal receiver 10 which may be included in receiving system 106 according to the present invention. Receiver 10 is comprised of a tuner 11, a decoder 12, a controller 13, a user interface 14, a character generator 15, and an adder 16. Although receiver 10 is specifically designed for the reception, tuning, and decoding of video signals supplied by a video signal network as described hereinabove, in the present invention it is of relatively simple construction and, thus, it is not used to control the operation of other video signal processing equipment, such as a video recording/reproducing device. However, receiver 10 may control a video display device. Therefore, the design of receiver 10 is greatly simplified and its cost is relatively low as compared to more complicated and sophisticated video receiving devices which are operable to control other devices.

Tuner 11 is a signal tuning device that receives frequency multiplexed input digital video signals as may be transmitted by CATV hub 103, and selects a particular digital video signal therefrom in response to tuner control signals from controller 13. Tuner 11 is further coupled to decoder 12, and supplies the selected video signal thereto. Decoder 12 processes the video signal by decoding, descrambling and/or decrypting, and the resultant processed video signal is supplied to adder 16.

User interface 14 is coupled to controller 13 and supplies user commands thereto. Controller 13 is further coupled to tuner 11, decoder 12, and character generator 15. By way of user interface 14, a user supplies user commands to controller 13 to control the operation of receiver 10. For example, controller 13 supplies tuner control signals to tuner 11 to control the selection of a particular video signal and decoder control signals to decoder 12 to control the processing of the selected video signal. Graphic control signals are supplied by controller 13 to character generator 15 to control the production of menu-type graphic displays to be displayed to the user. Character generator 15 generates graphic displays providing indications of the various operating parameters of receiver 10 that can be monitored or altered by a user, and supplies representative video signals to adder 16.

Adder 16 is a conventional circuit for combining video signals and is adapted to superimpose or otherwise add the video signals generated by character generator 15 to the processed video signals produced by decoder 12. The video signals which result from this operation are output from adder 16 to display 107.

Preferably, controller 13 is capable of controlling only the typical functions of tuner 11, decoder 12, and character generator 15 and is not used to control the functions of another apparatus other than a display device. Consequently, user interface 14 exhibits a simplified design limited to receiving user input command signals concerning only those parameters or functions of the receiver 10 that can be monitored or controlled by the user. User interface 14 is not used to issue user commands to control another apparatus other than a display device. Consistent with the above, character generator 15 generates a graphics display which illustrates for the user particular parameters and functions of receiver 10. Other graphical displays of parameters and functions for other apparatuses are not generated.

In operation, a user enters into user interface 14, such as by keyboard operation, a command to view a particular video signal. The user interface converts the user's input command into command signals which are transmitted to controller 13. The controller, in turn, issues tuner control signals to tuner 11 to select the particular video signal and issues decoder control signals to decoder 12 to decode the particular video signal. The tuner responds to the tuner control signals to select the particular video signal and to supply the selected video signal to the decoder, which decodes that video signal in accordance with the decoder control signals and outputs a processed (or decoded) video signal to adder 16.

Controller 13 may also issue graphics control signals to character generator 15, causing it to produce video signals corresponding to a menu or to a display of the operating parameters or functions of receiver 10. Adder 16 combines the video signals from decoder 12 and from character generator 15, if any, to produce an output video signal for display. In a similar manner, other functions of receiver 10 and display device 107, such as sound volume, brightness, contrast, hue, etc., can be controlled by a user.

Figure 5:
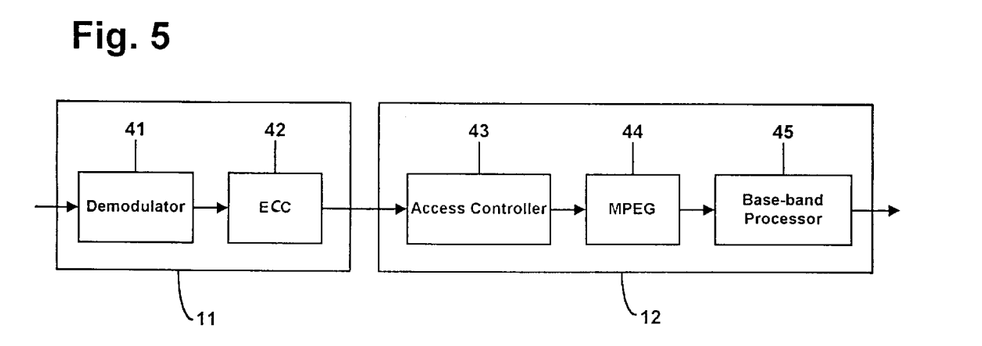
FIG. 5 is a block diagram illustrating in further detail the decoder 12 of FIG. 4.

An embodiment of tuner 11 and decoder 12 is illustrated in FIG. 5. Tuner 11 is comprised of demodulator 41 and an error correction circuit 42. Decoder 12 is comprised of an access controller 43, an MPEG decoder 44, and a base-band processor 45. Demodulator 41 demodulates the video signals that have been selected as a result of the tuner control signals and supplies demodulated video signals to error correction circuit 42. According to a conventional error correction scheme, error correction circuit 42 corrects errors in the video signals that may have been introduced during transmission, thereby producing corrected video signals. Circuit 42 is coupled to and supplies corrected video signals to access controller 43.

The access controller is operable to decode, descramble, and/or decrypt the corrected video signals. Operation of access controller 43 is controlled by controller 13. Alternatively, the access controller operates as a function of access control signals embedded in the corrected video signals or prestored in the access controller. Similarly, the decryption key needed to decrypt the video signals may be supplied by controller 13, embedded in the corrected video signals, or prestored in the access controller. The decoded, descrambled, and/or decrypted video signals are supplied from the access controller to MPEG decoder 44.

The MPEG decoder decodes the video signals supplied thereto in accordance with the particular standard used to MPEG-encode the signals and supplies decoded video signals to base-band processor 45. The base-band processor converts the decoded digital video signals into signals appropriate for display on display 107. For example, base-band processor 45 may add horizontal and vertical synchronization signals to the video signals, convert the video signals to RGB format, convert the video signals to chrominance and luminance signals, or similarly process the video signals. The converted video signals are supplied to adder 16 (FIG. 4) whereat they are combined with the graphics video signals from character generator 15.

Optionally, controller 13 may be coupled to one or more of demodulator 41, error correction circuit 42, MPEG decoder 44, and base-band processor 45 to control the specific operation of these elements in a manner known to those of skill in the art.

Figure 6:
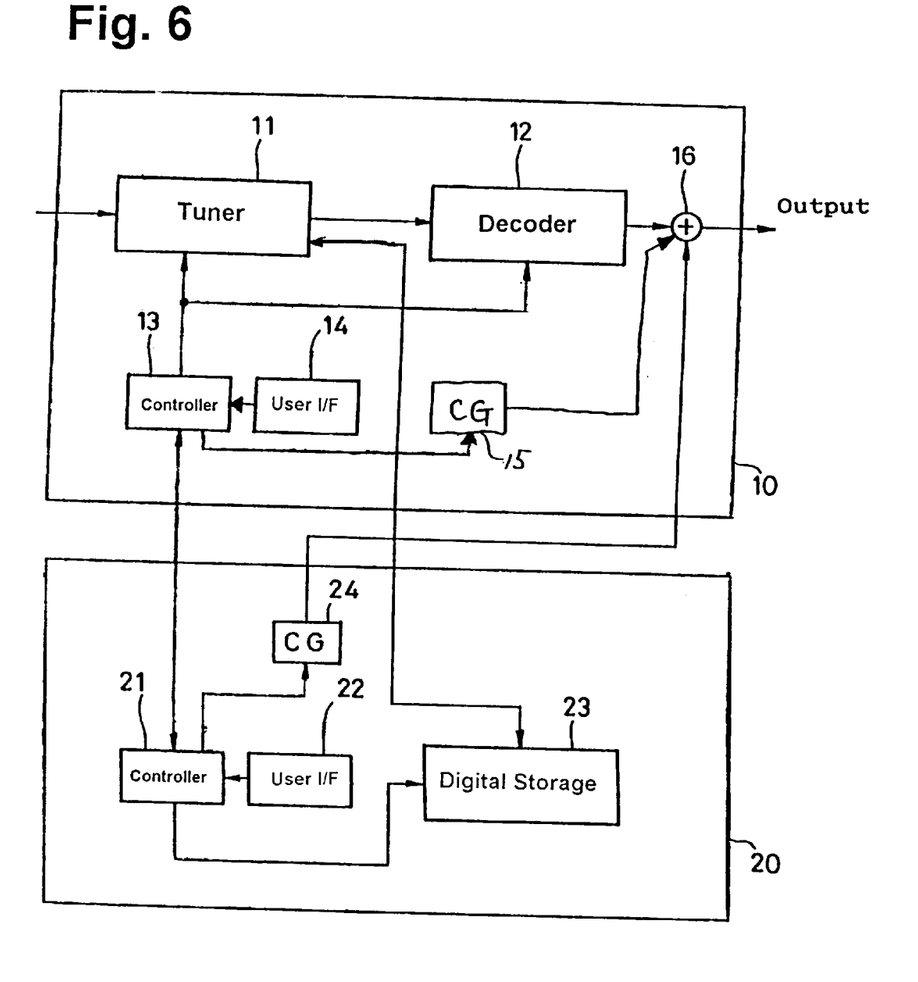
FIG. 6 is a block diagram of a combined video signal receiver and video signal recording/reproducing apparatus according to another embodiment of the present invention.

FIG. 6 illustrates receiver 10 combined with a recording/reproducing apparatus 20 which together implement a control system according to an embodiment of the present invention. In this embodiment, both receiver 10 and recorder 20 (for convenience, the recording/reproducing apparatus is referred to herein simply as a recorder) are controlled by elements of recorder 20, the corresponding control elements of receiver 10 being substantially disabled. Since receiver 10 of FIG. 6 is substantially identical to receiver 10 of FIG. 5, elements of the receivers having like structure and function are designated with like reference numerals. The discussion of receiver 10 in the following is intended to supplement the previous description thereof.

Recording/reproducing apparatus 20 is comprised of a controller 21, a user interface 22, a digital store 23, and a character generator 24. Character generator 24 is coupled to adder 16 of receiver 10 and supplies graphic displays providing indications of the operating parameters of both receiver 10 and recorder 20. Adder 16 superimposes or otherwise adds video signals generated by character generator 24 to processed video signals produced by decoder 12.

Digital store 23 is coupled to tuner 11 and to controller 21 and functions as a storage device for recording digital video signals and for reproducing prerecorded digital video signals and is typically comprised of a conventional recording medium, such as a video tape, a video disc, a semiconductor memory chip, or the like. In response to storage control signals supplied by controller 21, digital store 23 records video signals supplied by tuner 11. In response to other storage control signals from controller 21, digital store 23 reproduces prerecorded video signals and supplies the reproduced video signals to tuner 11.

As described above, tuner 11 is a signal tuning device that receives a plurality of channels of digital video signals or channels and selects a particular digital video signal therefrom. The selected video signal is supplied to decoder 12 for decoding and also is supplied, either before or after decoding, to digital store 23 for recording. In the present embodiment, the tuner is further adapted to receive video signals reproduced from the digital store and to supply the reproduced video signals to decoder 12 for processing.

Controller 21 is responsive to user commands from user interface 22 to generate graphic control signals that are supplied to character generator 24 to control the production of menu-type or recorder operation graphic displays to be displayed to the user. In addition, user commands are supplied through user interface 22 to controller 21 to control the operation of both receiver 10 and recorder 20, at which time user interface 14 of receiver 10 is disabled to prevent a user's entry of user commands through that interface. The disablement of user interface 14 can be achieved directly by removing power therefrom, indirectly by inhibiting controller 13 from responding to user commands from user interface 14, or by some similar method. Thus, user control of both receiver 10 and recorder 20 occurs through user interface 22. It will be appreciated that, due to the greater number of functions which can be controlled through user interface 22 (e.g., receiver functions and recording/reproducing functions), user interface 22 is necessarily more complex than user interface 14. It will also be appreciated that user interface 14 simply does not recognize user commands associated with a recording/reproducing device.

In the preferred embodiment, controller 13 is substantially disabled by controller 21 such that controller 13 merely routes specific control signals from controller 21 to each of tuner 11, decoder 12, and character generator 15. In an alternate embodiment, controller 21 issues receiver control signals to controller 13 to control the operation of receiver 10; and controller 13 converts these receiver control signals into control signals compatible with tuner 11, decoder 12 and character generator 15. In both embodiments, controller 21 is necessarily more complicated and costly than controller 13 since controller 21 controls the operation of both receiver 10 and recorder 20.

In a similar manner, character generator 15 is either substantially disabled or controlled by controller 21 through controller 13 to generate graphic displays complimentary to those produced by character generator 24. In the preferred embodiment, character generator 15 is simply disabled and character generator 24 is utilized instead to produce menu graphics as well as graphics associated with recording/reproducing functions for display. In an alternative embodiment, character generator 15 and character generator 24 are both controlled by controller 21 to produce complimentary menu graphics which are added together by adder 16 and superimposed on processed video signals from decoder 12. For example, character generator 15 may generate graphics displays associated only with the functionality of receiver 10 while character generator 24 may generate graphics displays associated either with both receiver 10 and recorder 20 or solely with recorder 20.

In operation, a user enters into user interface 22, as by keyboard operation, a command to view a particular video signal. User interface 22 converts the input command into user command signals which are transmitted to controller 21. Controller 21 responds to these user command signals to issue tuner and decoder control signals which are supplied, through controller 13, to tuner 11 to select the particular video signal and to decoder 12 to decode the particular video signal. Tuner 11 selects the particular video signal from the several channels applied thereto and supplies that signal to decoder 12 for decoding in accordance with the decoder control signals and for outputting to adder 16.

Controller 21 also issues graphics control signals to character generator 24, causing the character generator to produce character display signals corresponding to a menu or to the operating parameters or functions of receiver 10 and/or recorder 20. Adder 16 combines the video signals from decoder 12 and the character display signals from character generator 24 to produce an output video signal for display. In a similar manner, other functions of receiver 10 and, optionally, the functions of display device 107 can be controlled by a user through user interface 22 and controller 21.

In response to a user's command to record a video signal, controller 21 issues tuner control signals, which are supplied through controller 13 to tuner 11, to select the particular video signal; and the selected video signal is supplied to digital store 23. Controller 21 further issues a storage control signal to digital store 23 to record the video signal. Additionally, controller 21 controls character generator 24 to produce a suitable graphics display associated with the recording function for display to the user.

In response to a user's command to reproduce a prerecorded video signal, controller 21 issues a storage control signal to digital store 23 to reproduce the video signal. In response to the storage control signal, the digital store reproduces and supplies the prerecorded video signal to tuner 11 which, in turn, responds to tuner control signals from controller 21 (through controller 13) to direct the reproduced video signal to decoder 12. The decoder responds to decoder control signals from controller 21 to decode the reproduced video signal. Additionally, controller 21 controls character generator 24 to produce a suitable graphics display associated with the reproducing function for display to the user.

Figure 7:
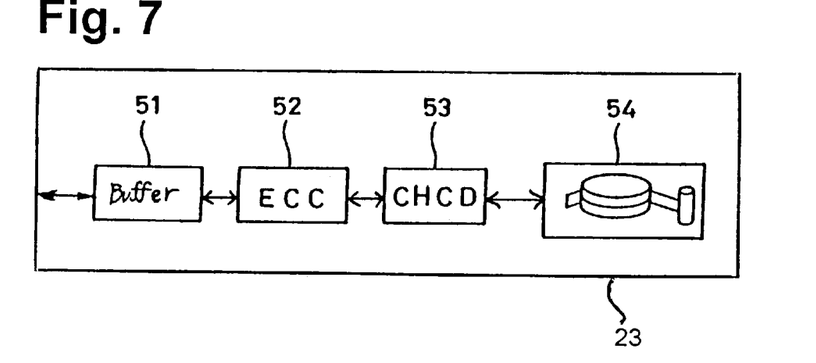
FIG. 7 is a block diagram illustrating in further detail the digital storage 23 of FIG. 6.

A preferred embodiment of digital store 23 is illustrated in FIG. 7 as comprising a buffer memory 51, an error correction circuit 52, a channel encoder/decoder 53 and a video tape recording/reproducing mechanism 54. Buffer memory 51 is coupled to tuner 11 (or to another video input) and to error correction circuit 52. Channel encoder/decoder 53 is coupled to error correction circuit 52 and to video tape recording/reproducing mechanism 54.

In a recording mode of operation, input video signals supplied by tuner 11 are stored in buffer memory 51 from which they are read by error correction circuit 52 and error correction codes are added thereto. The ECC-encoded video signals are modulated by channel encoder/decoder 53 to facilitate recording; and the modulated signals are recorded by tape recording/reproducing mechanism 54 on a storage tape (or other record medium).

In a reproducing mode of operation, tape recording/ reproducing mechanism 54 reproduces prerecorded modulated video signals from the storage medium and the reproduced video signals are demodulated by channel encoder/ decoder 53 and supplied to error correction circuit 52 which uses the error correction codes to correct errors found in the reproduced video signals. The error-corrected video signals are stored in buffer memory 51 for supply to tuner 11 and display, as aforedescribed.

Figure 8:
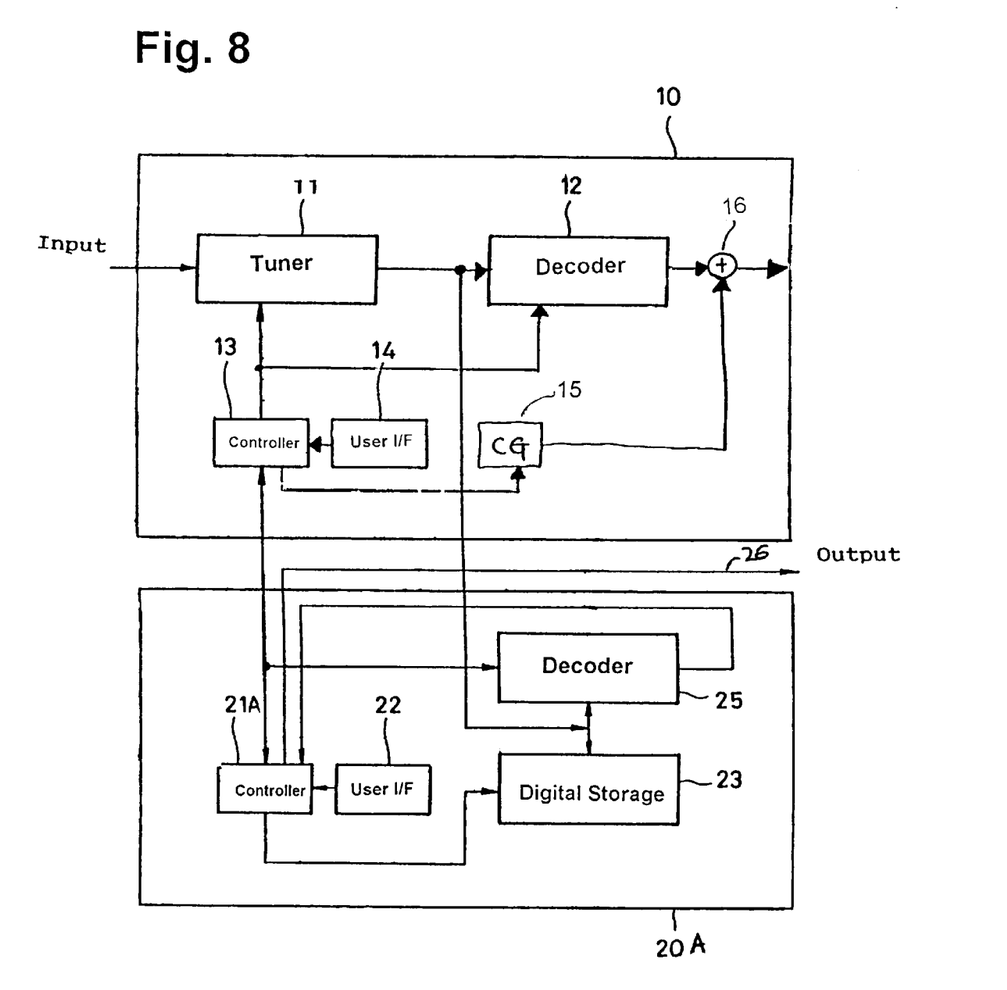
FIG. 8 is a block diagram of a combined video signal receiver and video signal recording/reproducing apparatus according to yet another embodiment of the present invention.

FIG. 8 illustrates receiver 10 combined with a recording/ reproducing apparatus 20A which together implement a control system according to another embodiment of the present invention. In this embodiment, both receiver 10 and recorder 20A are controlled by elements of recorder 20A, while the corresponding elements of receiver 10 are substantially disabled. Since receiver 10 of FIG. 8 is substantially identical to receiver 10 of FIG. 5, elements of the receivers having like structure and function are designated with like reference numerals. The discussion of receiver 10 in the following is intended to supplement the previous description thereof. Similarly, elements of recording/ reproducing apparatus 20A having like structure and function as corresponding elements of recording/reproducing apparatus 20 are designated with like reference numerals and repetitive description thereof is not provided herein.

Recording/reproducing apparatus 20A is comprised of a controller 21A, a user interface 22, a digital store 23, and a decoder 25. Decoder 25 is coupled to controller 21A, tuner 11, and digital store 23. Preferably, decoder 25 has the same structure as decoder 12, and when receiver 10 is connected to recorder 20A, decoder 12 is disabled by controller 21A. Decoder 25 receives a video signal from tuner 11 or from digital store 23 and decodes the video signal as described above. The decoded video signal is supplied to controller 21A from which it may be coupled to a suitable display device via an output terminal 26.

Digital store 23 also is coupled to tuner 11 and controller 21A; and in response to storage control signals supplied by controller 21A, the digital store records the video signals supplied thereto by tuner 11. Alternatively, digital store 23 reproduces prerecorded video signals and supplies the reproduced video signals to decoder 25 from which they are coupled to controller 21A.

As in the embodiment of FIG. 6, controller 21A is coupled to controller 13, user interface 22, and digital store 23. An output terminal 26 receives digital video signals from controller 21A. Controller 21A generates decoder control signals to control the decoding of video signals by decoder 25. Also, controller 21A generates storage control signals to control the operation of digital store 23 as previously described.

In contrast to controller 21, controller 21A includes a graphics generator for generating menu and other informational video graphics and for processing video signals to produce a reduced-size video picture, otherwise known as the "picture-in-picture" feature. In a preferred embodiment, controller 21A generates a menu page providing indications of the operating parameters of the receiver 10 and recorder 20A. Controller 21A further incorporates an adder circuit similar to adder 10 for combining the video graphics and a received or reproduced video signal to produce an output video signal for display. The output video signal is supplied to output terminal 26 which, preferably, is coupled to display 107.

Through user interface 22, controller 21A receives user commands supplied by a user via a suitable keyboard or other input device. Through user interface 22 and controller 21A, the user thus controls the operation of both receiver 10 and recording and reproducing apparatus 20A. As in FIG. 6, user interface 14 of receiver 10 is disabled when receiver 10 is connected to recorder 20A to prevent a user's entry of user commands through that interface.

In the preferred embodiment, controller 13 is substantially disabled by controller 21A such that controller 13 merely routes specific control signals from controller 21A to tuner 11, decoder 12, and character generator 15. In an alternate embodiment, controller 21A issues receiver control signals to controller 13 to control the operation of receiver 10. Controller 13 converts these receiver control signals into control signals compatible with tuner 11, decoder 12 and character generator 15. In both embodiments, controller 21A is necessarily more complicated and costly than controller 13 since controller 21A controls the operation of both receiver 10 and recorder 20A.

In operation, let it be assumed that a user enters, by way of, for example, a keyboard, a command to view a particular video signal. User interface 22 converts the user's input command into user command signals which are transmitted to controller 21A. Controller 21A issues, through controller 13, tuner control signals and decoder control signals to tuner 11 and to decoder 25. Tuner 11 responds to the tuner control signals to select the particular video signal from the several channels supplied thereto and supplies that signal to decoder 25 for decoding in accordance with the decoder control signals. The decoded video signal is output to controller 21A which, in turn, couples this video signal through output terminal 26 to display 107. Alternatively, controller 21A simply supplies the video signal to output terminal 26 for display. Controller 21A also is adapted to generate graphic display signals, as aforedescribed, for output via terminal 26 to display 107.

In response to a user's command to record a video signal, controller 21A issues tuner control signals which are supplied through controller 13 to tuner 11 to select the particular video signal for recording; and the selected video signal is supplied to digital store 23. Controller 21A further issues a storage control signal to digital store 23 to record the video signal. Additionally, controller 21A is adapted to generate suitable graphics display signals associated with the recording function for display to the user.

In response to a user's command to reproduce a prerecorded video signal, controller 21A issues a storage control signal to digital store 23 to reproduce the video signal. In response thereto, the digital store reproduces and supplies the prerecorded video signal to decoder 25, which, in turn, responds to decoder control signals from controller 21A to decode the reproduced video signal. The decoded video signal is supplied to controller 21A and then output via terminal 26 to display 107. Additionally, controller 21A is adapted to generate and output suitable graphics display signals associated with the reproducing function for display to the user.

Although illustrative embodiments of the present invention and modifications thereof have been described in detail herein, it is to be understood that this invention is not limited to these precise embodiments and modifications, and that other modifications and variations may be effected therein by one skilled in the art without departing from the scope and spirit of the invention as defined by the appended claims.

What is claimed is:

1. A video signal receiving system for receiving a plurality of channels of input video signals, said system comprising:
    a video signal receiver including:
        tuner means for selecting a video signal from said plurality of channels of input video signals;
        first decoding means, coupled to said tuner means, for decoding the selected video signal to produce a decoded video signal;
        first character generator means for generating a first graphics display signal representing a menu of receiver functions;
        first controller means, coupled to said tuner means, to said first decoding means, and to said first character generating means, for controlling said tuner means, said first decoding means, and said character generating means;
        adder means, coupled to said first decoding means and to said character generator means, for superimposing said first graphics display signal on said decoded video signal; and
        first user interface means, coupled to said first controller means, for receiving an operating command from a user; and
    a video signal recording and reproducing apparatus including:
        second character generator means for generating a second graphics display signal representing a menu of receiver functions and of recording and reproducing apparatus functions;
        storage means for recording the selected video signal and for reproducing a prerecorded video signal;
        second controller means, fixedly coupled to said second character generator means and to said storage means, for controlling said second character generator means and said storage means and for controlling said video signal recording and reproducing apparatus and said video signal receiver;
        means for removably coupling said second controller means with said first controller means;
        second user interface means, coupled to said second controller means, for receiving a command from a user to control both said video signal receiver and said video signal recording and reproducing apparatus; and
        second decoding means, coupled to said tuner means and to said second controller means, for decoding said video signal;
    wherein at least one of said first controller means and said first user interface means is disabled so as to prevent said video signal receiver from responding to user commands supplied to said first user interface means and for causing said second controller means to control said video signal receiver when said video signal recording and reproducing apparatus is coupled to said video signal receiver, and
    wherein said second controller is operable to disable said first decoding means when said video signal recording and reproducing apparatus is coupled to said video signal receiver.

2. A video system according to claim 1, wherein said second controller means is coupled to said first controller means.

3. A video system according to claim 2, wherein said adder means is coupled to said second character generator means and wherein said second graphics display signal is superimposed on said decoded video signal.

4. A video system according to claim 1, wherein said second controller means is operable to disable said first user interface means.

5. A video system according to claim 1, wherein said second controller means is operable to disable said first character generator means.

* * * * *